US012611365B2

(12) United States Patent
Mathew

(10) Patent No.: US 12,611,365 B2
(45) Date of Patent: Apr. 28, 2026

(54) BABY BOTTLE HOLDER

(71) Applicant: Melvin Puthenpurayil Mathew, Richmond, TX (US)

(72) Inventor: Melvin Puthenpurayil Mathew, Richmond, TX (US)

(*) Notice: Subject to any disclaimer, the term of this patent is extended or adjusted under 35 U.S.C. 154(b) by 0 days.

(21) Appl. No.: 18/201,774

(22) Filed: May 25, 2023

(65) Prior Publication Data

US 2024/0390232 A1 Nov. 28, 2024

(51) Int. Cl.
*A61J 9/06* (2006.01)

(52) U.S. Cl.
CPC ........... *A61J 9/0623* (2015.05); *A61J 9/0692* (2015.05)

(58) Field of Classification Search
CPC ........ A61J 9/0623; A61J 9/063; A61J 9/0653; A61J 9/0661; A61J 9/0692; A61J 9/06; A47G 19/2272
See application file for complete search history.

(56) References Cited

U.S. PATENT DOCUMENTS 2,539,698 A * 1/1951 Pearson ................ A61J 9/0661 248/104
3,003,727 A * 10/1961 Medor .................. A61J 9/0692 248/104
3,197,099 A * 7/1965 Doba .................... A61J 9/0638 224/613
4,670,909 A * 6/1987 Forrester .............. A41D 19/002 2/160
4,865,239 A * 9/1989 Timbrook ................. A45F 5/00 224/267
4,946,119 A * 8/1990 Hellhake ................... A61J 9/06 248/102
4,989,811 A * 2/1991 Millis ................... A61J 9/0661 248/104
5,192,041 A * 3/1993 Bryant .................. A61J 9/0684 248/104
5,397,039 A * 3/1995 Parcelles ............... A61J 9/0661 224/148.7
5,459,903 A * 10/1995 Treacy .................. A61J 9/0638 24/301
5,704,066 A * 1/1998 Yamamoto ........... A41D 19/015 2/160
5,873,551 A * 2/1999 Jones .................... A61J 9/0638 248/104
5,957,515 A * 9/1999 Van Der Sluys ...... A63H 33/00 224/220
6,003,821 A * 12/1999 Fabian .................. A61J 9/0638 248/104

(Continued)

*Primary Examiner* — Don M Anderson

(57) ABSTRACT

An exemplary baby bottle holder includes a first clamp member, a second clamp member, and a flexible arm interconnecting the first and second clamp members. The first clamp member engages and locks to the hand and wrist of the user, and includes a thumb finger lock and a hook and loop type locking mechanism. The second clamp member is for grasping a baby bottle, and includes an upper band to hold a main body of the bottle, and a lower circular structure to receive an end of the bottle. The flexible arm is made of a flexible and elastic material that allows the baby bottle holder to remain in a consistent shape and size. The user can wear the baby bottle holder and feed a baby with one hand only, and can thus utilize the other free hand for any desired purpose such as doing daily chores.

19 Claims, 3 Drawing Sheets

(56) References Cited

U.S. PATENT DOCUMENTS

| | | | | | |
|---|---|---|---|---|---|
| 6,146,319 | A * | 11/2000 | Tarail | A63B 21/4001 224/267 |
| 6,360,928 | B1 * | 3/2002 | Russo | A45F 5/00 24/3.2 |
| 6,606,768 | B2 * | 8/2003 | Henry | B62B 3/1456 24/3.13 |
| 6,971,612 | B1 * | 12/2005 | Wilson-Lowery | A61J 9/0684 248/104 |
| 6,978,918 | B2 * | 12/2005 | Scanlan | A61J 9/06 224/563 |
| D633,215 | S * | 2/2011 | Steele | D24/190 |
| D700,971 | S * | 3/2014 | Alvarado | D24/199 |
| D701,966 | S * | 4/2014 | Owada | D24/199 |
| D782,589 | S * | 3/2017 | Burdick | D21/756 |
| 2004/0079843 | A1 * | 4/2004 | Medwed | A61J 9/0661 248/104 |
| 2009/0156322 | A1 * | 6/2009 | Luly | A63B 69/0057 473/409 |
| 2011/0101178 | A1 * | 5/2011 | Chambers | A61J 9/0623 248/103 |
| 2012/0267403 | A1 * | 10/2012 | Ward, Jr. | A45F 5/00 224/219 |
| 2015/0136942 | A1 * | 5/2015 | Zayat | A47G 23/0241 248/690 |
| 2018/0255848 | A1 * | 9/2018 | Moreau | A41D 19/0024 |
| 2019/0022511 | A1 * | 1/2019 | Duch | A63B 71/143 |
| 2022/0112013 | A1 * | 4/2022 | Edlund Tjernberg | A61J 9/0661 |
| 2022/0160588 | A1 * | 5/2022 | Mathew | A61J 9/0676 |

* cited by examiner

BABY BOTTLE HOLDER

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The present invention relates to baby bottle holders and feeders, and more particularly pertains to a baby bottle holder and feeder which may be employed to hold a baby bottle using a single hand where the weight of the bottle is evenly distributed along the hand and wrist.

Description of the Related Art

A baby bottle is a small bottle used to feed a baby or an infant, and includes a nipple that encloses the top thereof and provides a means for the baby to obtain the liquid inside the bottle. The baby bottle is used as a substitute for breastfeeding and normally contains an infant formula or expressed breast milk. Baby bottles vary in size where larger bottles typically hold 270 milliliters and smaller bottles hold approximately 150 milliliters. An infant usually is unable to hold a bottle, and therefore while feeding an adult or guardian needs to hold the bottle while the baby sucks on the nipple to drink the formula. As a baby gets older and grows in size the baby may be able to hold the bottle, but many times the infant will drop the bottle during the feeding process.

Devices for holding baby bottles are well known to those skilled in the art. These devices are often used to hold the nursing bottle during the feeding of an infant. It is well known that an attendant such as a mother can experience difficulty in feeding a baby due to the fact that the bottle will roll down among bed clothes for example. This makes it necessary for the attendant to retrieve the bottle and to again put it in possession of the baby. It is often necessary for the attendant to hold the bottle continuously, while the baby is feeding. Furthermore, if the baby has gone to sleep it invariably wakes up when it loses the bottle. There are multiple inventions in the prior art in this regard.

For instance, a baby bottle holder and feeder is found in U.S. Pat. No. 5,489,075A issued to Ible; Robert L. The baby bottle holder and feeder includes a lightweight, hollow articulating arm. The articulating arm has a clamp member affixed at one end for the purpose of holding a baby bottle for feeding, and another clamp member affixed at the opposite end for the purpose of clamping the baby bottle holder and feeder to a nearby object such as a baby's car seat. The articulating arm is generally of plastic composition and permits movement by a child as required to initiate, perform, and terminate self-feeding. The clamp member holding the baby bottle has jaws and pads and is spring actuated. The pads are between planar extensions of the jaws, for softening impact therebetween subsequent to removal of the bottle should an older child desire such release.

Another baby bottle holder is found in U.S. Pat. No. 5,135,189A issued to Mansoor Ghazizadeh. The patent discloses an apparatus for holding a baby bottle. This device contains means for gripping the bottle and a flexible arm. The gripping means contains a base and, integrally formed therewith, at least two fingers extending from the base. Each of the fingers contains a top portion which extends divergingly away from the top portions of each of the other fingers.

U.S. Pat. No. 4,989,811A discloses an attachable baby bottle holder with an attaching mechanism, and is issued to Millis; Patricia C. The patent discloses a baby bottle holder composed of a sleeve of foam rubber material having a circular bottom piece of the same material, which together form a cylindrical jacket for holding the bottle. In addition, one end of an elastic strap is attached to the sleeve near its top, while a hoop and hook fastener arrangement is attached to the other end of the strap. The jacket and bottle may thus be secured to any suitable nearby object having an unobstructed or free cross-sectional area, by utilizing the strap and fastener. The jacket thus serves to both thermally insulate and physically protect the bottle. The strap restricts the movement of the jacket and bottle whenever the bottle is released by the baby using it, thereby greatly simplifying the bottle's retrieval.

U.S. Pat. No. 6,158,870A issued to Ramirez; John A. discloses a combination musical and lightable baby bottle. The patent depicts a nursing baby bottle attachment with an associated entertainment device(s). The entertainment device especially provides the options of either or both of chosen jingles of music and randomly flashing lights. When the music and lights are operating together, there is a micro-switch to turn off the lights only.

Another baby bottle holder is found in US patent application pub. no. 2008/0093513A1 filed by Vicki Kunzelman. A method and an apparatus are configured to promote or encourage baby self-feeding. A baby bottle holder includes a body defining an area to encourage the hands or arms of the baby to access the bottle. The baby bottle holder also includes a hypoallergenic filler.

U.S. Pat. No. 6,003,821A discloses a decorative holder for a baby bottle, and is issued to Bob Fabian. The a decorative holder includes a flexible arm having a bottle receiver at one end and a clamp at the opposite end. A decorative cover in the form of an animal is removably wrapped around the flexible arm, with the animal's head near the bottle receiver and the animal's groin near the clamp. A baby bottle is placed in the bottle receiver, the clamp is attached to a support structure such as a crib, and the flexible arm is positioned so the baby can feed.

A baby bottle holder is found in U.S. Pat. No. 5,873,551A issued to Jones; Philip J. The baby bottle holder provides for the hands free holding of a baby bottle for feeding an infant, thus enabling the person caring for the infant to have both hands free for holding the infant and/or performing other duties as required. The baby bottle holder comprises several embodiments. Each embodiment has a neck sling removably securable about the neck of the user, and a bottle securing strap removably securable about the neck of the bottle adjacent the nipple end of the bottle. Some embodiments comprise a pliable sleeve having a conical section with all diameters greater than that of the bottle. The bottle is placed in the sleeve with the nipple end located toward the larger diameter portion of the sleeve. The nipple of the bottle thus extends downwardly for feeding the infant, with the bottle being secured by the bottle securing strap. The bottle is easily tilted upwardly to preclude leakage from the nipple when not in use, by everting the sleeve over the upper end of the bottle. Other embodiments utilize an elastic strap for the sleeve, with a pliable connecting sheet or strap between the sleeve and the bottle securing strap. The bottle may be positioned with the nipple upward by sliding the sleeve toward the nipple end of the bottle, thus positioning the center of gravity of the bottle beyond the sleeve. Each embodiment allows the user to position the bottle easily either nipple downward or nipple upward, as desired.

A baby bottle holder is found in U.S. Pat. No. 5,192,041A issued to Bryant; Sheree M. A device for supporting an infant's feeding bottle includes a bottle holder, a first flexible rod optionally, a second flexible rod, a clamp member and a stand member. The feeding bottle may be selected from a plurality of feeding bottles having a range of different diameters. The device may be used while feeding an infant in a seat placed on a surface. The bottle holder has a flexible member for wrapping around the feeding bottle. The flexible member has Velcro™ material, and a buckle or the like for securing the feeding bottle to the bottle holder. The first flexible rod is attached to the bottle holder and the stand member. The second flexible rod may be pivotally attached to the first flexible rod. The clamp member is attached to the second flexible rod for clamping to the seat.

The baby bottle holders of the prior art have limitations with respect to the positions of use. As noted, many holders attach to a baby seat or may be integrated with the infant's seat. Other holders, although more flexible, are still geared toward attachment near the seat of the infant and may not have the flexibility to use in other circumstances. It is evident that a lot of labor and inconvenience would be obviated if some satisfactory means could be employed for holding the bottle in the proper position while the baby is feeding.

Hence, the inventor of the present invention proposes to resolve and surmount existing technical difficulties to eliminate the aforementioned shortcomings of the prior art.

SUMMARY

In light of the disadvantages of the prior art, the following summary is provided to facilitate an understanding of some of the innovative features unique to the present invention. However, the summary is not intended to be a full description. A full appreciation of the various aspects of the present invention can be gained by taking the entire specification, claims, drawings, and abstract as a whole.

The primary desirable object of the present invention is to provide a novel and improved form of bottle holding assembly.

Detailedly, the primary object of the present invention is to provide a means to bottle-feed and hold a baby using just one hand, wherein the means has a compact base design, will lock more securely to the hand, and provides a cushion inside for the wrist.

It is another object of the present invention to provide material which can easily adjust and retain its shape according to variable bottle or wrist size.

It is a further object of the present invention to provide an apparatus which can be used as a mobile device holder, bottle holder and cup holder.

It is also an object of the present invention to provide a holding assembly which is easy to use.

It is another object of the present invention to provide a holding assembly which is highly portable.

It is a further object of the present invention to provide a bottle holder that is economical in cost to manufacture.

It is a further object of the present invention to provide a new and improved form of bottle holder which is of a durable and reliable construction.

It is another object of the present invention is to provide a new and improved bottle holder which provides some of the advantages of the apparatuses and methods of the prior art, while simultaneously overcoming some of the disadvantages normally associated therewith.

It is a further object of the present invention to provide users with aesthetic satisfaction by showcasing a beautiful and smart design of a baby bottle holder.

The present invention provides a bottle holder which facilitates the user to hold a bottle with a single hand comfortably. A base of the device is compact, locks the assembly securely to the hand, and provides a cushion inside for the wrist. The user can lock the device to their hand using a thumb finger lock and a Velcro™ locking mechanism of the base. The bottle can be placed in a circular locking mechanism which provides a universal fit for every type of bottle. The material of the circular locking mechanism is flexible, and retains its shape as per the user's adjustment.

This summary is provided merely for purposes of outlining some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and claims and the accompanying figures.

DETAILED DESCRIPTION

Figure 1:
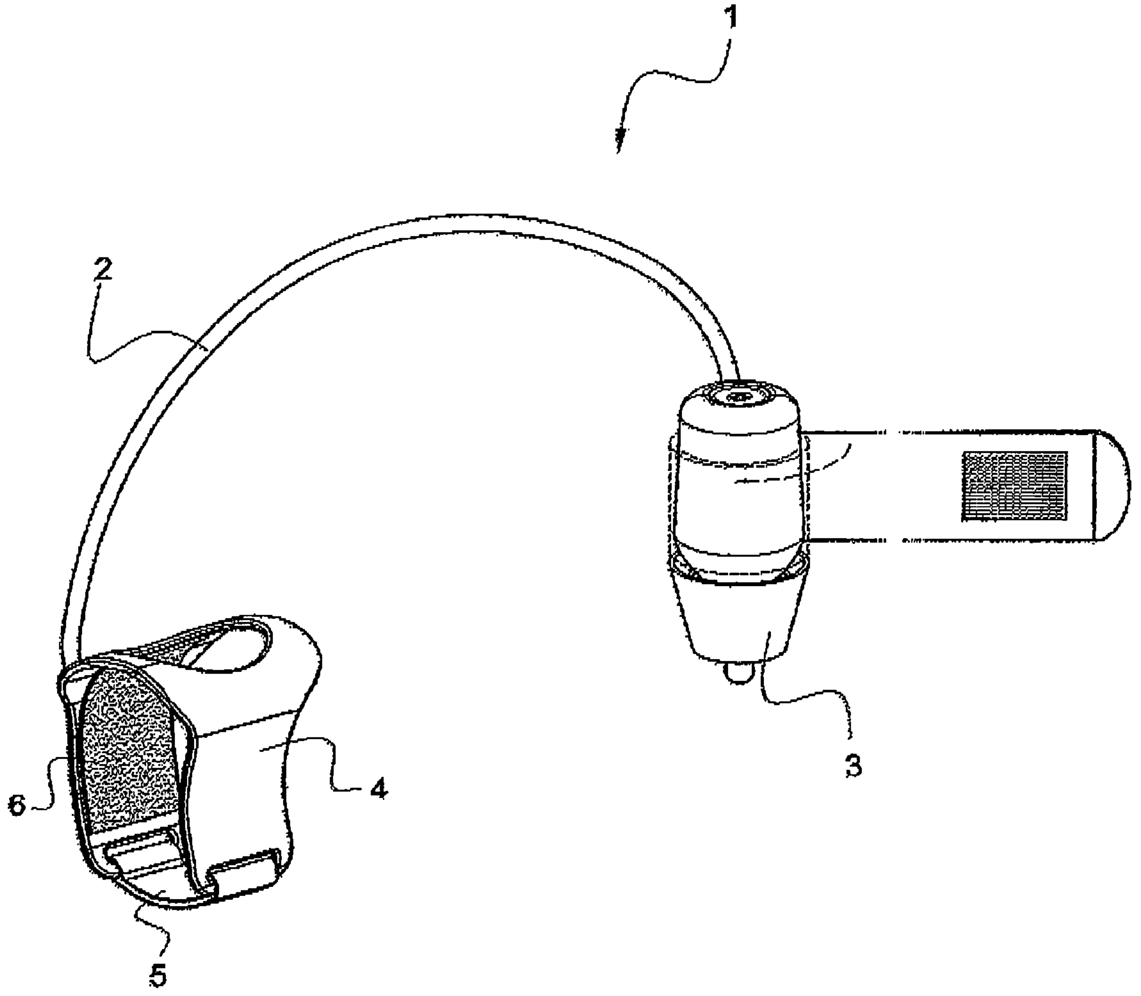
FIG. 1 is an isometric view of a preferred baby bottle holder of the present invention.

Detailed descriptions of the preferred embodiment and other embodiments are provided herein. It is to be understood, however, that the present invention may be embodied in various other forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention provides a bottle holding assembly which allows the user to hold the bottle using a single hand. The present invention as per its preferred embodiment is a bottle holding assembly in the form of a baby bottle holder, which allows the user to feed the baby using a single hand. The user just uses the one hand with the assembly comfortably, and is free to perform other tasks using the other hand.

The bottle holding assembly is designed in such a way that the device can be easily worn on the wrist of the user. The assembly is highly flexible and hence can be used at any angle and with minimal effort required to adjust the position of the baby's head relative to the angle of the bottle. This facilitates a common task that a typical parent faces.

The bottle holding assembly is designed in such a way that it evenly distributes the load of the bottle along the user's wrist and arm, and thus avoids the user's arm getting tired after feeding for a long period of time.

For instance, a mother holds a baby in her lap, and feeds the baby through the bottle. The mother uses a baby bottle holder 1 shown in FIGS. 1 and 2. The mother can lock the baby bottle holder 1 to her hand using a first clamp member 4. The first clamp member 4 can also be described as a base 4, and is compact. In the illustrations, the first clamp member 4 includes a thumb finger lock 5 and a Velcro™ locking mechanism 6. The Velcro™ locking mechanism 6 is a hook and loop type of locking mechanism. The bottle is securely placed upside-down in a circular locking mechanism 3. The locking mechanism 3 can also be described as a means 3 for gripping a bottle, or a second clamp member 3. In the illustrations, the locking mechanism 3 includes a circular inverted frustum-shaped bottom portion for holding a tapered top end of the bottle, and a string-like structure that can tightly grasp the bottle therewithin by wrapping around a main body of the bottle. The string-like structure can also be described as a band. A top end of the bottom portion of the locking mechanism 3 includes a mouth.

The baby bottle holder 1 can be used by anyone with any skill level, and does not require a user to undergo a learning curve. A similar device to the baby bottle holder 1 can be used as a cup holder. A similar device can be used as a mobile device holder. The main exemplification of the present invention, however, is the baby bottle holder 1 used to hold baby bottles.

Figure 2:
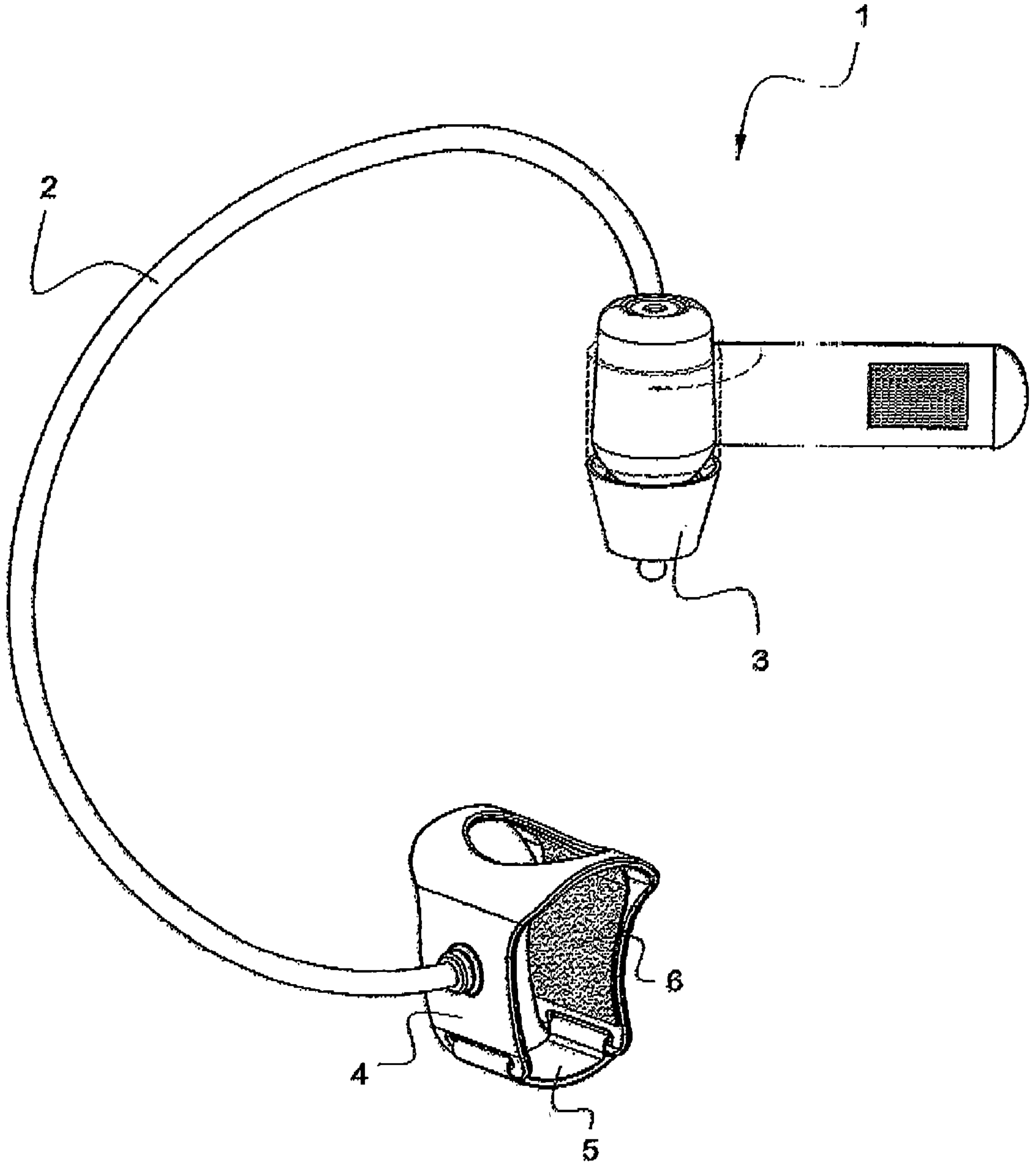
FIG. 2 is another isometric view of the preferred baby bottle holder of the present invention.

Now to explain the present invention further, FIGS. 1 and 2 show the baby bottle holder 1 as per the preferred embodiment of the present invention. The baby bottle holder 1 can also be described as an apparatus 1 for holding a baby bottle. The baby bottle holder 1 comprises the means 3 for gripping a bottle, and a flexible arm 2, where the user can lock the device to their hand using the thumb finger lock 5 and the Velcro™ locking mechanism 6. The locking mechanism 6 provides a tight and reliable grip on the user's hand. The flexible arm 2 has a first end and a second end, and is made of a flexible and elastic material. This allows the baby bottle holder 1 to remain in a consistent shape and size. When the flexible arm 2 is fully extended to its maximum length, the distance between the first clamp member 4 and the locking mechanism 3 is less than about 1.5 feet.

The baby bottle holder 1 weighs less than about 1 pound.

Figure 3:
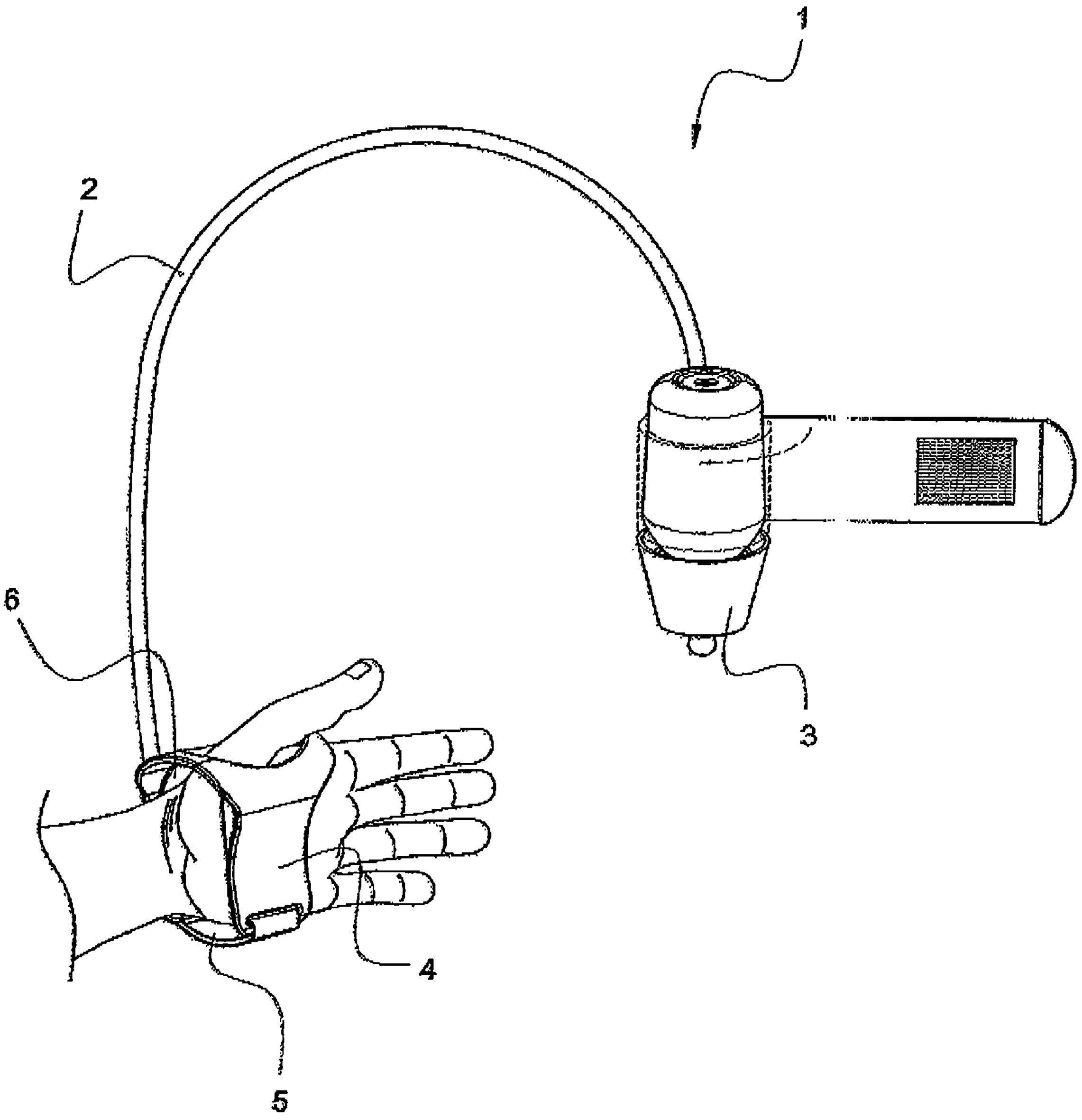
FIG. 3 is similar to FIG. 1, but showing conventional use of the preferred baby bottle holder of the present invention.

FIG. 3 shows the baby bottle holder 1 in use. The user wears the baby bottle holder 1, with the first clamp member 4 being in its closed form. The first clamp member 4 provides a cushion inside for the wrist. FIGS. 1 and 2 best show the multiple hook and loop nature of the Velcro™ locking mechanism 6. As per the preferred embodiment of the present invention, the user can lock the baby bottle holder 1 to their hand using the thumb finger lock 5 and the Velcro™ locking mechanism 6.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components described have been represented where appropriate by conventional symbols in the drawings; showing only those specific details that are pertinent to understanding embodiments of the present invention, so as not to obscure the disclosure with details that will be readily apparent to those of ordinary skill in the art having the benefit of the description herein.

While a specific embodiment(s) has been shown and described, many variations are possible. With time, additional features may be employed. The particular shape or configuration of the embodiment(s) or the interior configuration may be changed to suit the system or equipment with which it is used.

Having described the present invention in detail, those skilled in the art will appreciate that modifications may be made to the present invention without departing from its spirit. Therefore, it is not intended that the scope of the present invention be limited to the specific embodiment(s) illustrated and described. Rather, it is intended that the scope of the present invention be determined by the appended claims and their equivalents.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the accompanying claims reflect, inventive subject matter lies in less than all features of a single disclosed embodiment. Thus, the accompanying claims are hereby incorporated into the Detailed Description, with each claim standing on its own as a separately claimed piece of subject matter.

The invention claimed is:

1. A baby bottle holder comprising:

a first clamp member comprising a hook and loop type locking mechanism and a thumb finger lock for engaging and locking to a hand and wrist of a user;

a second clamp member comprising an upper band and a lower circular structure, wherein the lower circular structure has a mouth adapted to receive an end of a baby bottle and the upper band is configured to grasp the bottle tightly therewithin; and a flexible arm interconnecting the first clamp member and the second clamp member, wherein the flexible arm is made of a flexible and elastic material that allows the baby bottle holder to remain in a consistent shape and size.

2. The baby bottle holder of claim 1, wherein the upper band is wrappable around a main body of the bottle.

3. The baby bottle holder of claim 2, wherein the lower circular structure is frustum-shaped for holding a tapered end of the bottle.

4. The baby bottle holder of claim 1, wherein the first clamp member further comprises a cushion therewithin for the wrist of the user.

5. The baby bottle holder of claim 1, wherein when the flexible arm is fully extended, a distance between the first clamp member and the second clamp member is less than 1.5 feet.

6. The baby bottle holder of claim 1, wherein when the first clamp member is engaged and locked to a hand and wrist of a user and the second clamp member grasps a baby bottle, the load of the bottle is evenly distributed along the wrist and an adjoining arm of the user.

7. A cup holder comprising:

a first clamp member comprising a hook and loop type locking mechanism and a thumb finger lock configured for cooperatively engaging and locking to a hand and wrist of a user;

a second clamp member comprising an upper band and a lower frustum-shaped structure, wherein the lower frustum-shaped structure is configured to receive a bottom end of a cup and the upper band is wrappable around the cup to grasp the cup tightly therewithin; and a flexible arm interconnecting the first clamp member and the second clamp member, wherein the flexible arm is made of a flexible and elastic material that allows the cup holder to remain in a consistent shape and size.

8. The cup holder of claim 7, wherein the first clamp member further comprises a cushion therewithin for the wrist of the user.

9. The cup holder of claim 7, wherein when the flexible arm is fully extended, a distance between the first clamp member and the second chump member is less than 1.5 feet.

10. The cup holder of claim 7, wherein the cup holder weighs less than 1 pound.

11. The cup holder of claim 7, wherein when the first clamp member is engaged and locked to a hand and wrist of a user and the second clamp member grasps a cup, the load of the cup is evenly distributed along the wrist and an adjoining arm of the user.

12. A baby bottle holder comprising:

a first clamp member comprising a hook and loop type locking mechanism and a thumb finger lock for engaging and locking to a hand and wrist of a user;

a second clamp member comprising an upper band and a lower hollow circular structure, wherein the lower hollow circular structure is adapted to receive a top end of a baby bottle and the upper band is configured to grasp the bottle tightly therewithin; and a flexible arm interconnecting the first clamp member and the second clamp member, wherein the flexible arm is made of a flexible and elastic material that allows the baby bottle holder to remain in a consistent shape and size thereby maintaining the second clamp member at a desired distance from the first clamp member and in a desired orientation.

13. The baby bottle holder of claim 12, wherein the upper band is wrappable around a main body of the bottle.

14. The baby bottle holder of claim 13, wherein the lower circular structure is frustum-shaped for holding a tapered end of the bottle.

15. The baby bottle holder of claim 12, wherein the first clamp member further comprises a cushion therewithin for the wrist of the user.

16. The baby bottle holder of claim 12, wherein when the flexible arm is fully extended, a distance between the first clamp member and the second clamp member is less than 1.5 feet.

17. The baby bottle holder of claim 12, wherein the baby bottle holder weighs less than 1 pound.

18. The baby bottle holder of claim 12, wherein when the first clamp member is engaged and locked to a hand and wrist of a user and the second clamp member grasps a baby bottle, the load of the bottle is evenly distributed along the wrist and an adjoining arm of the user.

19. The baby bottle holder of claim 1, wherein the baby bottle holder weighs less than 1 pound.

* * * * *